US012014249B2

(12) United States Patent
Mishraky et al.

(10) Patent No.: US 12,014,249 B2
(45) Date of Patent: Jun. 18, 2024

(54) PAIRED-CONSISTENCY-BASED MODEL-AGNOSTIC APPROACH TO FAIRNESS IN MACHINE LEARNING MODELS

(71) Applicant: Intuit Inc., Mountain View, CA (US)

(72) Inventors: Elhanan Mishraky, Tel Aviv (IL); Yair Horesh, Tel Aviv (IL); Yehezkel Shraga Resheff, Tel Aviv (IL)

(73) Assignee: INTUIT INC., Mountain View, CA (US)

( * ) Notice: Subject to any disclaimer, the term of this patent is extended or adjusted under 35 U.S.C. 154(b) by 984 days.

(21) Appl. No.: 16/732,893

(22) Filed: Jan. 2, 2020

(65) Prior Publication Data

US 2021/0209499 A1 Jul. 8, 2021

(51) Int. Cl.
*G06N 20/00* (2019.01)
*G06F 16/22* (2019.01)

(52) U.S. Cl.
CPC ......... *G06N 20/00* (2019.01); *G06F 16/2246* (2019.01)

(58) Field of Classification Search
CPC .................................... G06F 16/2379
USPC .......................................... 706/12
See application file for complete search history.

(56) References Cited

U.S. PATENT DOCUMENTS

2016/0203221 A1\* 7/2016 Rao ................. G06Q 50/01
707/707
2019/0349263 A1\* 11/2019 Ghosh ............... H04L 41/0873
2020/0327196 A1\* 10/2020 Sampat ............... G06N 20/00

\* cited by examiner

*Primary Examiner* — Sibte H Bukhari
(74) *Attorney, Agent, or Firm* — DLA PIPER LLP (US)

(57) ABSTRACT

Systems and methods that implement a paired-consistency-based process for evaluating and or regulating fairness in machine learning models.

16 Claims, 6 Drawing Sheets

PAIRED-CONSISTENCY-BASED MODEL-AGNOSTIC APPROACH TO FAIRNESS IN MACHINE LEARNING MODELS

DETAILED DESCRIPTION OF SEVERAL EMBODIMENTS

Figure 1:
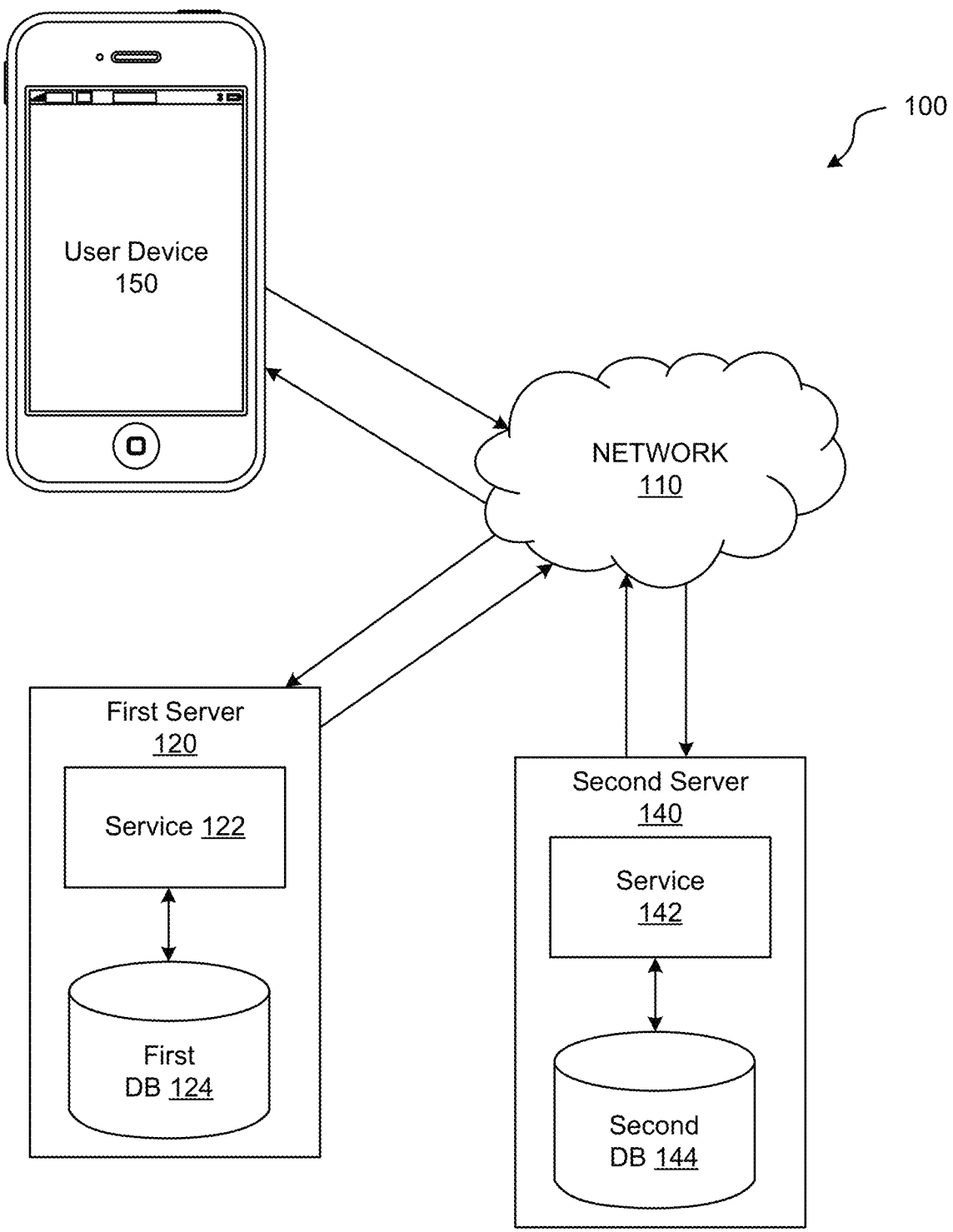
FIG. 1 shows an example of a system configured in accordance with an embodiment of the present disclosure.

Embodiments described herein may be used to mitigate discrimination in machine learning models. In one or more embodiments, the disclosed principles are implemented without explicitly removing protected variables (e.g., gender, race, age, etc.) from the model's input data. The disclosed principles may rely on the ability of a fair domain expert to generate pairs of examples ("consistency pairs") that are equivalent based on all attributes except for a subset of the protected variables. In accordance with the disclosed principles, it is expected that a fair model should treat the two examples in each consistency pair in a similar way. A measure of consistency, referred to herein as "paired-consistency," may be used to evaluate the model's fairness and or may be added to a model's loss function to regulate the model's fairness based on paired-consistency (i.e., the model is regulated to enforce fairness).

As artificial intelligent (AI) systems become more and more complex, it has become increasingly difficult to ensure non-discrimination of gender, race, and other protected variables in these systems. With the rise in popularity of AI across many domains, questions of ethical use and fairness must be revisited with renewed vigor. Methods have been proposed to help create fair machine learning algorithms, when the variable leading to potential discrimination is explicitly available in the data. However, this is not always the case.

While explicit discrimination is easy to detect and remove, features that are correlated to discriminating attributes are much harder to detect. Features that are correlated to discriminating attributes may be referred to as bias by proxy features. Consider a classification or a regression task via some method f(•) with the following dataset:

$$\{(d^{(i)}, x^{(i)}, y^{(i)})\}_{i=1}^{N}$$

Where Y is the target variable, and D and X are separate feature spaces. In this example D contains the protected variables. Restricting the fitting of f(•) solely through X clearly eliminates explicit discrimination with respect to features in D. However, although $Y \perp D|X$, we might still observe association between the predictions and D, since $Y \not\perp D$ in the general case, even when D is not included in the fitting stage. Hence, even if the protected attributes are completely removed from the input data, fairness is not guaranteed.

Accordingly, there is a need and desire for mechanism that may properly assess the fairness of a machine learning model and regulate the model's fairness without the need to strip the protected attributes from the model's input data.

In a supervised learning framework, one or more embodiments may utilize a domain expert to sample a model's dataset for "consistency pairs" meeting two requirements: 1) the two pair members belong to two instances of potential discrimination (e.g., male and female); and 2) the two pair members should get roughly the same assignment according to the judgment of the expert. The expert may assign weights to the pairs (e.g., a very clear case of potential discrimination may get higher weight than other consistency pairs).

In one or more embodiments, an extension may be added to the labeled dataset used to train and or evaluate a machine learning model. In one or more embodiments, the extension may comprise consistency pairs, which are a set of data point pairs that may be (1) expected to be rated the same (e.g., each data point in the pair may belong to different instances of potential discrimination) and (2) are expected to be assigned similarly. A paired-consistency performance metric may also be defined and may be used to measure how close the model's output is regarding these consistency-pairs for which fairness mandates identical decisions. In one or more embodiments, paired-consistency may be embedded within the model's loss function to regulate the model based on fairness.

For example, in a risk model for loans, consistency pairs may be carefully selected requests, each consisting of one male and one female, matched on all relevant aspects. A good classifier will be accurate, but also consistent in the scoring of the pairs (i.e., the loan request should be denied or accepted for both subjects). As a result, in accordance with the disclosed principles, domain experts may take part in the process and mitigate discrimination without the need to understand how the model works and or what its input features are.

In one or more embodiments, a computer implemented method for analyzing a machine learning model is disclosed. The method may be performed on a computing device, and comprises: inputting a dataset for use with the machine learning model, the input dataset comprising one or more features associated with a protected feature of users identified within the dataset; generating by a domain expert a plurality of consistency pairs based on at least one feature from the one or more features within the input dataset; and analyzing the machine learning model using the plurality of consistency pairs and the input dataset.

In one or more embodiments, the analyzing step comprises performing at least one of a model fairness evaluation process or a model fairness regulation process on the machine learning model.

FIG. 1 shows an example of a system 100 configured to implement the paired-consistency-based process for evaluating and or regulating fairness in machine learning models according to an embodiment of the present disclosure. System 100 may include a first server 120, second server 140, and/or a user device 150. First server 120, second server 140, and/or user device 150 may be configured to communicate with one another through network 110. For example, communication between the elements may be facilitated by one or more application programming interfaces (APIs). APIs of system 100 may be proprietary and/or may be examples available to those of ordinary skill in the art such as Amazon® Web Services (AWS) APIs or the like. Network 110 may be the Internet and/or other public or private networks or combinations thereof.

First server 120 may be configured to implement a first service 122, which in one embodiment may be used to input the model's training dataset and or its test dataset via network 110 from one or more databases 124, 144, the second server 140 and/or user device 150. For example, first server 120 may execute the paired-consistency-based process for evaluating and or regulating fairness in machine learning models according to the disclosed principles using the model's training dataset and or its test dataset stored in database 124, database 144 and or received from second server 140 and/or user device 150. First service 122 or second service 142 may implement an information service, which may maintain data run through the model being evaluated and or regulated. The information service may be any network 110 accessible service that maintains the data run through the model being evaluated and or regulated. A non-limiting example set of information services may include Mint®, TurboTax®, QuickBooks®, QuickBooks Self-Employed®, and QuickBooks Online® by Intuit® of Mountain View California.

User device 150 may be any device configured to present user interfaces and receive inputs thereto. For example, user device 150 may be a smartphone, personal computer, tablet, laptop computer, or other device.

First server 120, second server 140, first database 124, second database 144, and user device 150 are each depicted as single devices for ease of illustration, but those of ordinary skill in the art will appreciate that first server 120, second server 140, first database 124, second database 144, and/or user device 150 may be embodied in different forms for different implementations. For example, any or each of first server 120 and second server 140 may include a plurality of servers or one or more of the first database 124 and second database 144. Alternatively, the operations performed by any or each of first server 120 and second server 140 may be performed on fewer (e.g., one or two) servers. In another example, a plurality of user devices 150 may communicate with first server 120 and/or second server 140. A single user may have multiple user devices 150, and/or there may be multiple users each having their own user device(s) 150.

Figure 2:
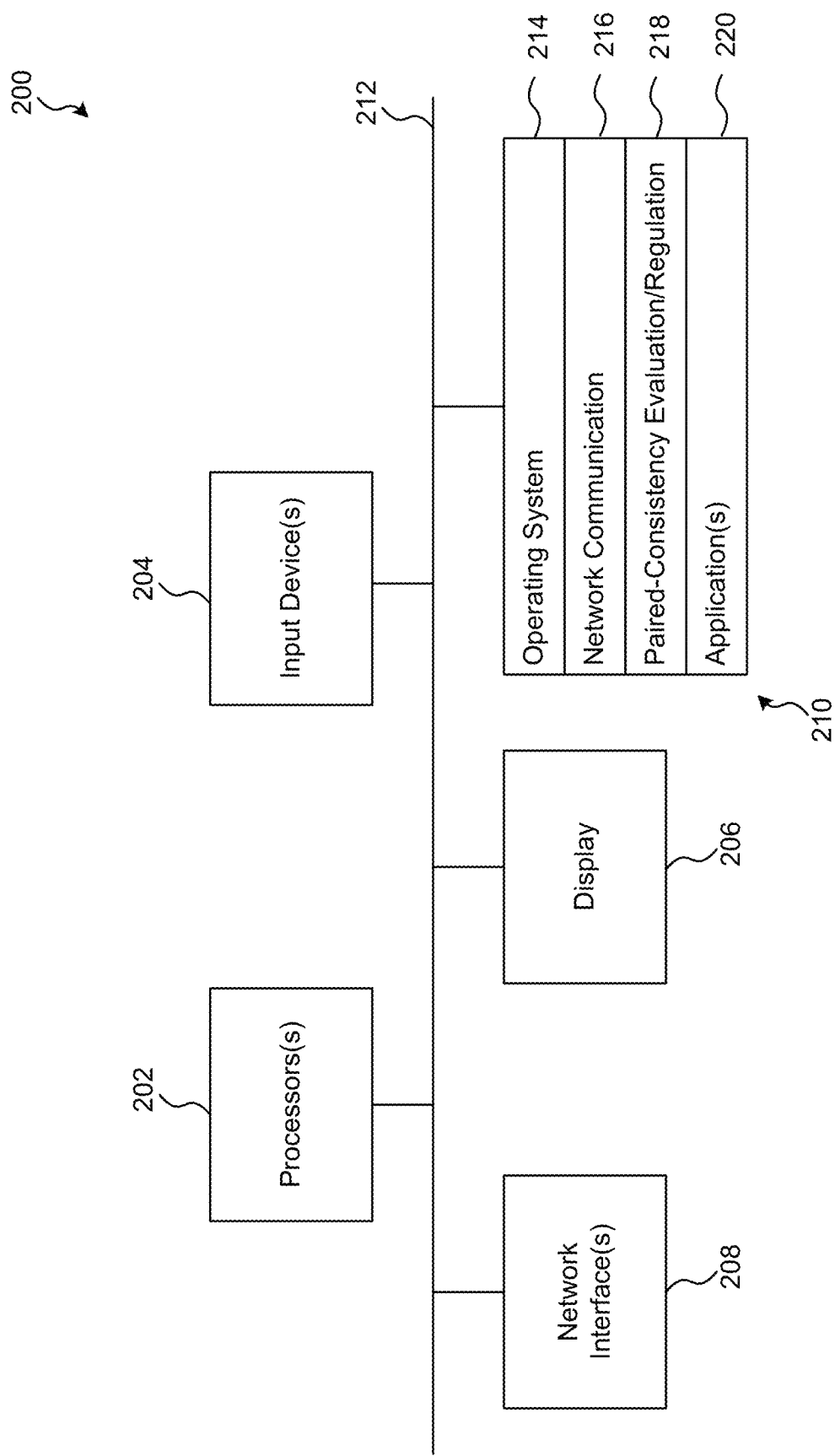
FIG. 2 shows a server device according to an embodiment of the present disclosure.

FIG. 2 is a block diagram of an example computing device 200 that may implement various features and processes as described herein. For example, computing device 200 may function as first server 120, second server 140, or a portion or combination thereof in some embodiments. The computing device 200 may be implemented on any electronic device that runs software applications derived from compiled instructions, including without limitation personal computers, servers, smart phones, media players, electronic tablets, game consoles, email devices, etc. In some implementations, the computing device 200 may include one or more processors 202, one or more input devices 204, one or more display devices 206, one or more network interfaces 208, and one or more computer-readable media 210. Each of these components may be coupled by a bus 212.

Display device 206 may be any known display technology, including but not limited to display devices using Liquid Crystal Display (LCD) or Light Emitting Diode (LED) technology. Processor(s) 202 may use any known processor technology, including but not limited to graphics processors and multi-core processors. Input device 204 may be any known input device technology, including but not limited to a keyboard (including a virtual keyboard), mouse, track ball, and touch-sensitive pad or display. Bus 212 may be any known internal or external bus technology, including but not limited to ISA, EISA, PCI, PCI Express, NuBus, USB, Serial ATA or FireWire. Computer-readable medium 210 may be any medium that participates in providing instructions to processor(s) 202 for execution, including without limitation, non-volatile storage media (e.g., optical disks, magnetic disks, flash drives, etc.), or volatile media (e.g., SDRAM, ROM, etc.).

Computer-readable medium 210 may include various instructions 214 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 204; sending output to display device 206; keeping track of files and directories on computer-readable medium 210; controlling peripheral devices (e.g., disk drives, printers, etc.) which can be controlled directly or through an I/O controller; and managing traffic on bus 212. Network communications instructions 216 may establish and maintain network connections (e.g., software for implementing communication protocols, such as TCP/IP, HTTP, Ethernet, telephony, etc.).

Paired-consistency evaluation/regulation instructions 218 may include instructions that implement the disclosed paired-consistency-based process for evaluating and or regulating fairness in machine learning models as described herein.

Application(s) 220 may be an application that uses or implements the processes described herein and/or other processes. The processes may also be implemented in operating system 214.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

Figure 3:
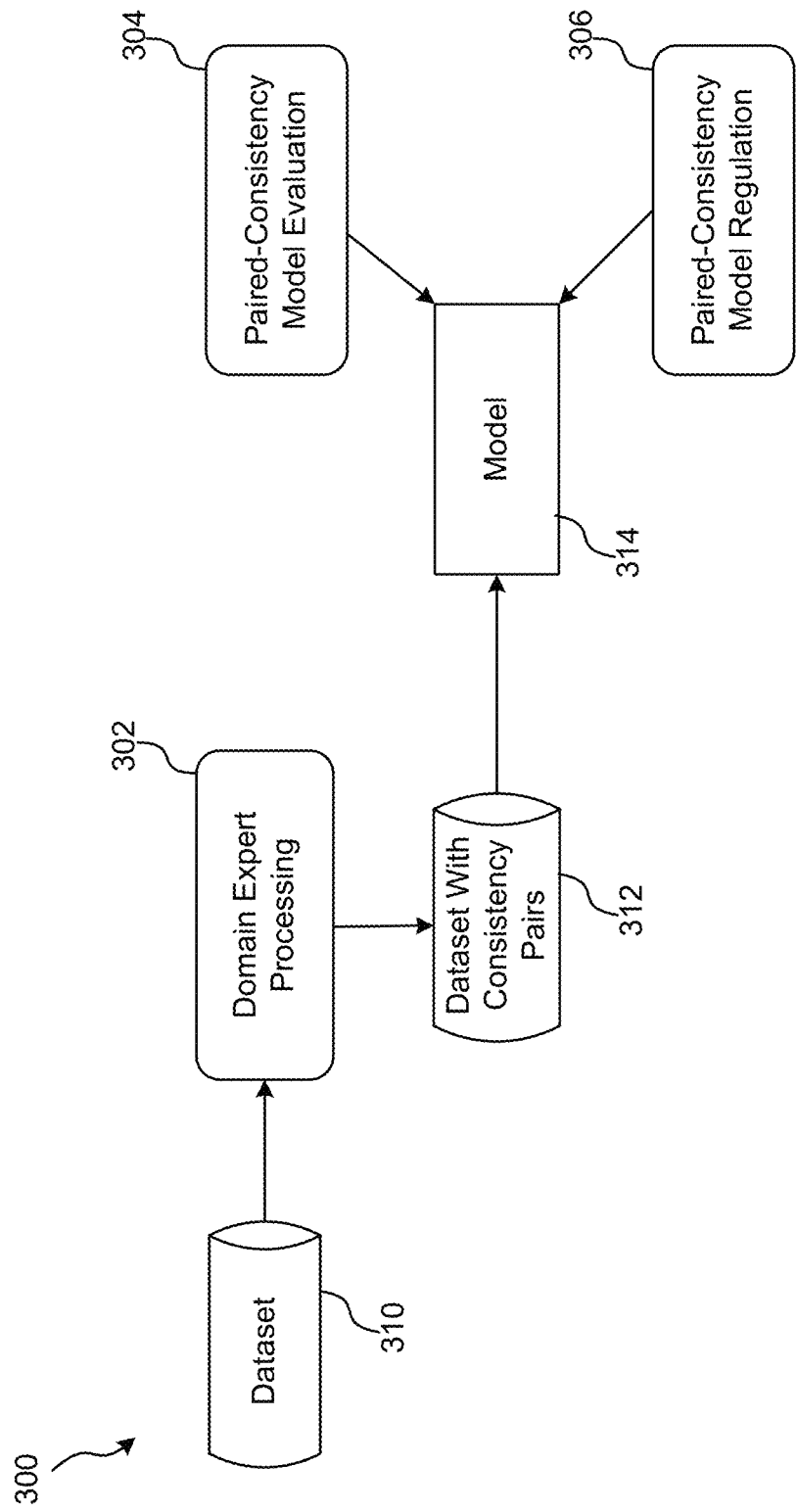
FIG. 3 shows a functional block diagram of an example paired-consistency-based process for evaluating and or regulating fairness in machine learning models according to an embodiment of the present disclosure.

FIG. 3 illustrates a functional block diagram of an example paired-consistency-based process 300 for evaluating and or regulating fairness in machine learning models according to an embodiment of the present disclosure. The process 300 may include a domain expert process 302, paired-consistency model evaluation process 304, and a paired-consistency model regulation process 306.

In one embodiment, system 100 may perform some or all of the processing illustrated in FIG. 3. For example, first server 120 may perform the domain expert process 302, paired-consistency model evaluation process 304, and paired-consistency model regulation process 306 discussed in detail below with respect to FIGS. 4-6. Moreover, during the execution of the domain expert process 302, first server 120 may input a machine learning model's dataset from a database 310, which may be the first database 124 and or second database 144, and output a dataset with consistency pairs (disclosed below in more detail) that may be stored in a database 312, which may be the first database 124 and or second database 144. In one embodiment, the dataset with consistency pairs may include the original dataset from database 310 along with consistency pairs in accordance with the disclosed principles. While shown as separate databases, in one or more embodiments, database 310 and database 312 can be part of the same database. In one embodiment, a model being trained and or evaluated in accordance with the disclosed principles may be executed on the first server 120 and or second server 140.

Figure 4:
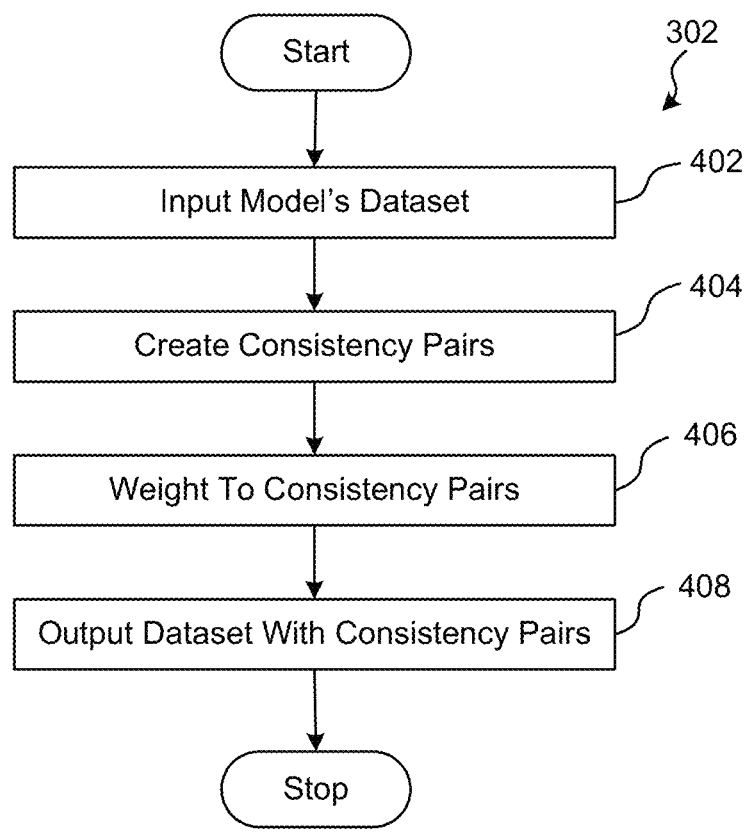
FIG. 4 shows an example domain expert process that may be used in the paired-consistency-based process for evaluating and or regulating fairness in machine learning models according to an embodiment of the present disclosure.

FIG. 4 illustrates an example domain expert process 302 that may be used in the paired-consistency-based process 300 for evaluating and or regulating fairness in machine learning models according to an embodiment of the present disclosure. The domain expert process 302 may use a (fair) domain expert that is able to label pairs of instances within the model's dataset. Each pair has a different value in a subset of protected variables D, and the expert declares that a fair model should output a similar response for them. In one embodiment, the expert may be a human expert trained to formed consistency pairs in accordance with the disclosed principles. In one or more embodiments, the expert may be an algorithm or method for forming consistency pairs in accordance with the disclosed principles.

To this end, at step 402, the process 302 may input the model's dataset from the database 310. In one embodiment, the dataset may be characterized as: $\{(d^{(i)}, x^{(i)}, y^{(i)})\}_{i=1}^{N}$, where each set consists of features x, an additional (and possibly empty) set of explicitly given restricted variables d, and a target y.

At step 404, the domain expert may create a set of consistency pairs based on the input dataset. In one or more embodiments, the domain expert may be equipped with a notion of fairness, and of the potential attributes that must be protected from discrimination. These attributes may be explicit (i.e., contained in the dataset as variable d and may include protected attributes such as e.g., gender or age), or more complex constructs that the expert is able to determine based on a sample (d; x; y) (e.g., factors indicating that the subject is from an underprivileged background).

In one or more embodiments, the expert creates a set of consistency pairs that may be represented as: $\{(x_1^{(j)}, x_2^{(j)})\}_{j=1}^{M}$. Each of these pairs may consist of the features from two examples of the original dataset that obey two requirements. First, the pair may represents two examples that are different with respect to the protected attribute as determined by the expert. Second, based on the remainder of the information, the expert may be able to judge that the two samples warrant a similar response by the model.

In one embodiment, the process 302 may include step 406 where the domain expert applies a weight to one or more of the pairs. For example, the expert may create a weight reflecting how sure it is that the pair is indeed a fairness-match—i.e., different on some subset of the protect variables or constructs, but deserving of the same treatment. In these embodiments, the set of consistency pairs may be represented as: $\{(x_1^{(j)}, x_2^{(j)}, w^{(j)})\}_{j=1}^{M}$, with w being the assigned weight.

At step 408, the process 302 may output the dataset with the consistency pairs created during steps 404-406. In one embodiment, the consistency pairs may be stored in the database 312. In one or more embodiments, the consistency pairs may be stored in the database 312 along with the original dataset retrieved from database 310. It should be appreciated that the disclosed principles are not limited to the specific manner in which the original dataset and the dataset with the consistency pairs are stored or maintained.

In one or more embodiments, the domain expert pairing process 302 can be fully or partially automated by selecting pairs that are close on all features except for the protected features or the features that are proxies to the protected features. The distance between pairs may be easily calculated using Euclidian distances or similar vector distance methods. In one or more embodiments, the domain expert pairing process 302 may be automated by selecting a subset of the test set and, for each sample, creating a copy that is different from the original only with respect to the protected features or the protected features' proxy. For each sample, the original and the modified sample may be paired, expecting the output prediction to be same.

An interesting property of the paired-consistency process 300 disclosed herein is that it may be able to prevent/mitigate discrimination even when the protected variable in not explicitly found in the dataset and even when it is not directly measurable. For example, this may be suitable for scenarios where individuals with certain special circumstances are historically under-represented and a fair selection process might therefore attempt to take this into consideration. Furthermore, the disclosed principles may be able to mix and combine fairness with respect to different potential sources of discrimination, by combining the sets of pairs derived from each one.

Figure 5:
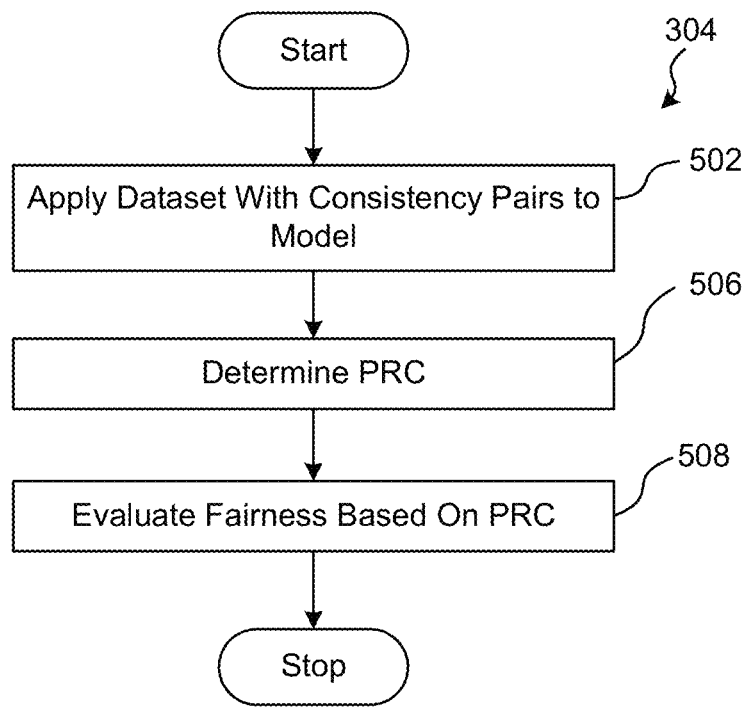
FIG. 5 shows an example paired-consistency model evaluation process that may be used in the paired-consistency-based process for evaluating and or regulating fairness in machine learning models according to an embodiment of the present disclosure.

FIG. 5 shows an example paired-consistency model evaluation process 304 that may be used in the paired-consistency-based process 300 for evaluating and or regulating fairness in machine learning models according to an embodiment of the present disclosure. As will be shown below, the process 304 may utilize a paired-consistency score, which measures how similar a model's output (in terms of assigned class, or predicted score) is with respect to paired members. For classification, this score may be:

$$\frac{1}{M}\sum_{j=1}^{M} I[\hat{y}_1^{(j)} = \hat{y}_2^{(j)}] \quad (1)$$

where $\hat{y}_1^{(j)} = f(x_1^{(j)})$ is the model output, and I[ ] is the indicator function. This measures the fraction of the pairs on which the model agrees.

For regression, this score may be:

$$1 - \frac{1}{M \cdot \delta_{max}}\sum_{j=1}^{M} (\hat{y}_1^{(j)} = \hat{y}_2^{(j)})^2 \quad (2)$$

where $\delta_{max}$ is the maximal square difference, used to normalize the score into a range of 0 to 1. It should be appreciated that this is necessary only when comparing models, otherwise the measure becomes:

$$\frac{1}{M}\sum_{j=1}^{M} (\hat{y}_1^{(j)} - \hat{y}_2^{(j)})^2 \quad (3)$$

As discussed below, the principles disclosed herein may utilize a precision, recall, and consistency (PRC) score. In one or more embodiments, the PRC score may be the weighted harmonic mean of a precision score, recall score and paired-consistency score.

To this end, the process 304 at step 502 may apply the dataset with the consistency pairs to the model 314. At step 504, the process 304 may determine the PRC score based on the model's output. At step 506, the fairness of the model may be evaluated based on the PRC score. For example, presuming that a loan expert matched ten QuickBooks® payment-enable applications to five consistency pairs. In this example, each pair, except for the first pair, was given equal weight. In this example, the first pair was associated with almost identical applications, but one was made in New York and the other in Los Angeles. This first pair was weighted double the other pairs. The classifier assigned the same classification to the first and second pairs, and a different classification to the others. The paired-consistency score in this example was: 1−(2*0+1*0+1*1+1*1+1*1)/6=0.5. In the example, precision score was 0.8 and the recall score was 0.7. In this example, the PRC score is the harmonic mean of (0.8, 0.7, 0.5), which is 0.64 (all three arguments weighted the same). Fairness may be determined based on this 0.64 PRC score in accordance with the disclosed principles. For example, if it was determined that the PRC score was too low, indicating that the model was not fair, process 306 could be executed in an attempt to regulate the model and make it more fair with respect to discrimination.

Figure 6:
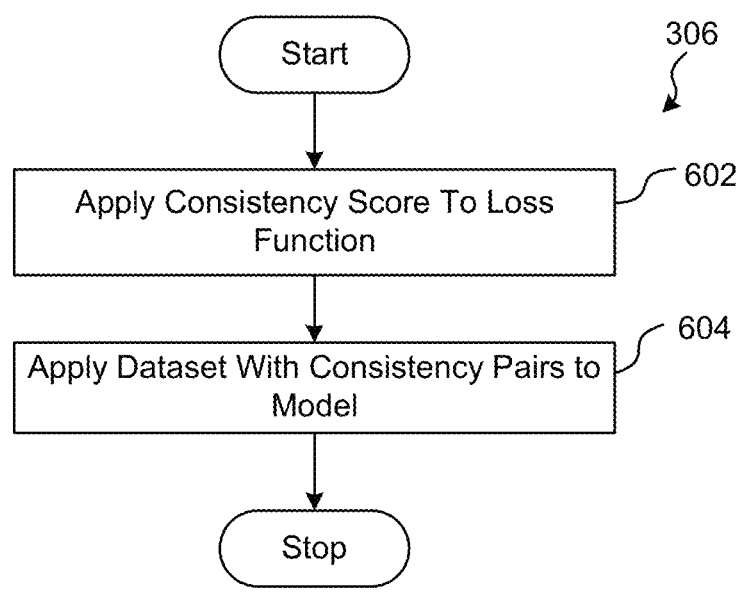
FIG. 6 shows an example paired-consistency model regulation process that may be used in the paired-consistency-based process for evaluating and or regulating fairness in machine learning models according to an embodiment of the present disclosure.

FIG. 6 shows an example paired-consistency model regulation process 306 that may be used in the paired-consistency-based process 300 for evaluating and or regulating fairness in machine learning models according to an embodiment of the present disclosure. At step 602, the process 306 may apply the paired-consistency score (e.g., as determined in step 506) to the model's 314 loss function (as discussed below), which may then be used to train the model 314 (e.g., at step 604).

For example, entropy or gini impurity, often used in decision trees, can by extended to include paired-consistency, making the training fairness-aware (in the tree training example, for instance, this may mean adding the requirement that both members of a selected consistency-pair should always track the same path in the tree). It should be appreciated that the paired-consistency score is embedded within the loss function as a fairness regularization term, to make the model consistency aware. This may be done by adding the measure shown above in Equation 2 to the objective and then multiplying it by a trade-off parameter to determine the relative importance of the main objective and the paired-consistency. Any algorithm trained via gradient-descent (and variants) may be adapted to incorporate this additional loss component.

In addition to, or alternatively, for fairness-based model selection, the score may be calculated post-hoc, and may be aggregated with other performance metrics, or used as part of a performance-fairness trade-off. A good classifier will be accurate, but also consistent in the scoring of the pairs as shown by the determined PRC score.

At step 604, the process 306 may apply the dataset with the consistency pairs to the model 314 to train the model 314. This may be referred to as paired-consistency awareness training.

As noted above, the disclosed principles may also allow a natural integration of the certainty of the expert by applying weights to the consistency pairs. For example, the expert may create a weight reflecting how sure it is that the pair is indeed a fairness-match—different on some subset of the protect variables or constructs, and deserving of the same treatment—so that the set of consistency pairs may be represented as: $\{(x_1^{(j)}, x_2^{(j)}, w^{(j)})\}_{j=1}^{M}$, with w being the assigned weight. The classification paired-fairness measure (Equation 1) may thus become:

$$\frac{\sum_{j=1}^{M} w^{(j)} \cdot I[\hat{y}_1^{(j)} = \hat{y}_2^{(j)}]}{M \cdot \sum_{j=1}^{M} w^{(j)}} \quad (4)$$

In one embodiment, the process 306 may be used with tree-based model training. In one embodiment, the process 306 may be used with gradient-based model (e.g., logistic regression model) training. It should be appreciated that these simple models provide readily interpretable outcome that lets the process 306 better understand the effect of the fairness regularization, and at the same time these are representatives of the two major classes of current machine learning models.

In one embodiment, the disclosed paired-consistency principles may add to the logistic regression model by inserting the mean square deviation in the output among pairs (Equation 2) directly to the loss function, via a trade-off parameter. For tree training, the fairness metric may be assed as an extension to the gini index used in the tree creation. In order to adapt the measure (Equation 1) to the local criterion of tree growing, for a given split the disclosed principles may attempt to maximize the number of pairs that go in the same direction. To this end, the process may add to the gini index a term that is the percent of the pairs arriving at the node that are kept intact following the split (i.e. both examples in the pair go to the same side). This term may be multiplied by a trade-off parameter that controls the relative importance of the fairness regularization in the tree construction. As expected when training trees, this is a local optimization criterion. Feature importance in the resulting model may be measured using the column permutation method.

One of the merits of the disclosed principles is that they enable domain experts to take part in the fairness efforts and may mitigate discrimination without the need to understand how the model works or what features or information it is based on. More advantageously, by using examples, the expert bypasses the need to formalize the potentially elusive notion of fairness. In fact, the fairness labelling may and should be done by an expert prior to and independently from the machine learning process. Since the labeling is independent from the methods used to make predictions, it can be seen as an extension of labeling for supervised learning rather than part of the process of evaluating results of a model. However, new consistency pairs can be generated after a model is created to further evaluate its fairness properties with respect to discriminating variable of interest.

Adding new consistency pairs does not require the model itself to be changed, only to be re-trained. As such, the disclosed process 300 is an advancement in the machine learning art because it can be implemented without additional coding or changes to the model.

As can be appreciated, the principles disclosed herein can be implemented without impacting storage and or processing resources. Models can be evaluated with a small subset of the typical dataset used to test a model. Processing remains substantially the same as only a few new constructs are added to the evaluation and regulation process. Indeed, the regulation process can be performed using different mechanisms and without changing the model itself. These amount to a major improvement in the technological art as they improves the functioning of a computer and is an improvement to the technology and technical field of machine learning models.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A computer implemented method for analyzing a machine learning model, said method being performed on a computing device, said method comprising:
    inputting a dataset for use with the machine learning model, the input dataset comprising one or more features associated with a protected feature of users identified within the dataset;
    generating by a domain expert a plurality of consistency pairs based on at least one feature from the one or more features within the input dataset, each consistency pair containing different examples of the protected feature but warranting a similar response by the machine learning model; and
    analyzing the machine learning model using the plurality of consistency pairs and the input dataset.

2. The method of claim 1, wherein said analyzing step comprises performing at least one of a model fairness evaluation process or a model fairness regulation process on the machine learning model.

3. The method of claim 2, wherein performing the model fairness evaluation process comprises:
inputting the plurality of consistency pairs and the input dataset into the machine learning model;
determining, based on an output of the machine learning model, a precision score, a recall score and a paired-consistency score for the model; and
determining a fairness of the machine learning model based on the determined precision score, recall score and paired-consistency score.

4. The method of claim 2, wherein performing the model fairness evaluation process comprises:
inputting the plurality of consistency pairs and the input dataset into the machine learning model;
determining, based on an output of the machine learning model, a precision score, a recall score and a paired-consistency score for the model;
determining a harmonic mean of the precision score, recall score and paired-consistency score; and
determining the fairness of the machine learning model based on the harmonic mean of the precision score, recall score and paired-consistency score.

5. The method of claim 2, wherein performing model fairness regulation process comprises:
inputting a paired-consistency score for the machine learning model into a loss function of the model; and
training the machine learning model with training data comprising a subset of the consistency pairs and the input dataset.

6. The method of claim 5, wherein training the machine learning model comprises using a tree-based training process and the training comprises:
adding the paired-consistency score as an extension to a gini index used in to tree create a tree associated with the machine learning model; and
maximizing a number of consistency pairs to go in a same direction in the tree.

7. The method of claim 5, wherein training the machine learning model comprises using the paired-consistency score in a logistic regression-based training process.

8. The method of claim 1 further comprising:
generating by the domain expert a weight value for each of the plurality of consistency pairs; and
analyzing the machine learning model using the weighted plurality of consistency pairs and the input dataset.

9. A system for analyzing a machine learning model, said system comprising:
a first computing device connected to a second computing device through a network connection, the first computing device configured to:
input a dataset for use with the machine learning model, the input dataset comprising one or more features associated with a protected feature of users identified within the dataset;
generate by a domain expert a plurality of consistency pairs based on at least one feature from the one or more features within the input dataset, each consistency pair containing different examples of the protected feature but warranting a similar response by the machine learning model; and
analyze the machine learning model using the plurality of consistency pairs and the input dataset.

10. The system of claim 9, wherein said computing device analyzes the machine learning model by performing at least one of a model fairness evaluation process or a model fairness regulation process on the machine learning model.

11. The system of claim 10, wherein performing the model fairness evaluation process comprises:
inputting the plurality of consistency pairs and the input dataset into the machine learning model;
determining, based on an output of the machine learning model, a precision score, a recall score and a paired-consistency score for the model; and
determining a fairness of the machine learning model based on the determined precision score, recall score and paired-consistency score.

12. The system of claim 10, wherein performing the model fairness evaluation process comprises:
inputting the plurality of consistency pairs and the input dataset into the machine learning model;
determining, based on an output of the machine learning model, a precision score, a recall score and a paired-consistency score for the model;
determining a harmonic mean of the precision score, recall score and paired-consistency score; and
determining the fairness of the machine learning model based on the harmonic mean of the precision score, recall score and paired-consistency score.

13. The system of claim 10, wherein performing the model fairness regulation process comprises:
inputting a paired-consistency score for the machine learning model into a loss function of the model; and
training the machine learning model with training data comprising a subset of the consistency pairs and the input dataset.

14. The system of claim 13, wherein training the machine learning model comprises using a tree-based training process and the computing device performs the training by:
adding the paired-consistency score as an extension to a gini index used in to tree create a tree associated with the machine learning model; and
maximizing a number of consistency pairs to go in a same direction in the tree.

15. The system of claim 13, wherein training the machine learning model comprises using the paired-consistency score in a logistic regression-based training process.

16. The system of claim 10 wherein the computing device is further configured to:
generate by the domain expert a weight value for each of the plurality of consistency pairs; and
analyze the machine learning model using the weighted plurality of consistency pairs and the input dataset.

* * * * *